United States Patent [19]

Heiberg

[11] Patent Number: 5,201,121
[45] Date of Patent: Apr. 13, 1993

[54] MULTIPLE PURPOSE KITCHEN IMPLEMENT

[75] Inventor: Jakob Heiberg, Copenhagen, Denmark

[73] Assignee: Dart Industries Inc., Deerfield, Ill.

[21] Appl. No.: 754,805

[22] Filed: Sep. 4, 1991

[51] Int. Cl.⁵ .................. B26B 3/00; B26B 11/00; A47J 43/28

[52] U.S. Cl. ........................ 30/123; 30/169; 30/324

[58] Field of Search ............ 30/123, 136, 165, 169, 30/298.4, 315, 316, 356, 324; 15/236.01, 236.02, 236.04, 236.06, 236.07, 236.08

[56] References Cited

U.S. PATENT DOCUMENTS

| | | |
|---|---|---|
| D. 199,962 | 1/1965 | Peterson . |
| D. 208,190 | 8/1967 | Parry . |
| D. 221,244 | 7/1971 | Lawrence . |
| D. 233,586 | 11/1974 | Kopp . |
| D. 297,494 | 9/1988 | Derting, Jr. . |
| 969,528 | 9/1910 | Disbrow ................... 30/169 |
| 975,599 | 11/1910 | Bates . |
| 1,704,329 | 3/1929 | Klaus ........................ 30/169 |
| 2,291,179 | 7/1942 | Woginrich ............... 30/169 |
| 2,824,330 | 2/1958 | Williams .................. 15/236.08 |
| 2,935,758 | 5/1960 | Muscott ................... 15/236.07 |
| 3,178,747 | 4/1965 | Peterson . |
| 3,865,370 | 2/1975 | Rogers ..................... 30/169 |
| 4,172,321 | 10/1979 | Greenberg ............... 30/165 |
| 4,970,749 | 11/1990 | Priore ....................... 30/169 |
| 5,065,977 | 11/1991 | Desjardin ................. 15/236.08 |
| 5,077,900 | 1/1992 | Jamentz .................. 30/324 |

Primary Examiner—Douglas D. Watts
Assistant Examiner—Paul M. Heyrana
Attorney, Agent, or Firm—John A. Doninger

[57] ABSTRACT

A multiple purpose kitchen implement including a flat sheet arcuately formed along a longitudinal center line and provided with an arcuate cutting blade defined at one longitudinal end and a beaded handle defined at the opposite longitudinal end. The opposed side edges of the sheet include projecting teeth with the teeth along one edge being approximately twice the height of the teeth along the opposite edge. A mounting opening is provided through the sheet transversely thereof and closer to the handle end than the blade end. The mounting opening includes an inner arcuate edge and an outer arcuate edge with a projecting lip for respective engagement with inner and outer surfaces of a bowl to mount the implement thereto.

7 Claims, 1 Drawing Sheet

MULTIPLE PURPOSE KITCHEN IMPLEMENT

BACKGROUND OF THE INVENTION

The invention is broadly concerned with food preparation in a kitchen environment, and more particularly relates to means for performing the multiple tasks involved therein, including the preparation and mixing of ingredients, the scraping of bowls and pans the decoration of foodstuffs such as cakes, and the like.

While hand-held culinary scrapers of a variety of shapes are known, these known devices are normally single purpose implements, that is they are concerned only or primarily with the ability to scrape the interior of a pan, bowl or the like. Such implements are of limited practical utility and, as they are used at only one stage of the culinary procedure, are easily misplaced or disregarded.

Similarly, single purpose implements are normally used for the performance of many other common tasks, such as food scoops for adding ingredients, blades for slicing dough and similar foodstuffs, and edged instruments for decorating foods such as cakes.

SUMMARY OF THE INVENTION

The culinary utensil or implement comprising the present invention is a multiple purpose item capable of utilization at several different stages of a culinary process, from the initial adding and mixing of ingredients to the decorative finishing of the food and the cleaning of the bowls.

The utensil is adapted to be hand-held and is so configured and peripherally defined as to function as a scraper, cutting implement, food scoop, means for decorating cake icing, and the like. The utensil is also adapted for mounting directly to the lip of a bowl, defining a platform, with a slightly concave configuration, which projects over the interior of the bowl for assisting in the controlled introduction of ingredients into the bowl for mixing or blending thereof.

Additional advantages reside in the ease with which the instrument can be manually grasped for manipulation, the ability of the implement to stand upright on a work surface so as to leave the surface clear while at the same time retaining the implement readily available for use, and the ease with which the instrument itself can be cleaned, notwithstanding the multiple structural features thereof which define the scope of use of the implement.

In order to provide for the multiple features discussed above, the implement is formed of a sheet of substantially rigid material, for example polypropylene which may have a slight degree of resilient flexibility to assist in conforming to the interior of a bowl during the scraping thereof and to allow for a non-scratching engagement with a bowl surface whereby adhered foodstuffs can be removed without damage to the bowl.

The implement sheet is thin and of a substantially constant thickness throughout the extent thereof. The sheet is of approximately equal length and width and is transversely arced, about a longitudinal axis, to define a shallow concavo-convex cross-section approximately conforming to the peripheral interior of a mixing bowl of, for example, 3 liter capacity, such being a typical bowl used with the implement of the invention.

The opposed side edges of the implement, parallel to the longitudinal axis, are provided with multiple teeth therealong with the teeth along one of the edges being of a relatively greater projection and spacing than the teeth of the other edge. Such edges enhance the scraping ability of the implement and are so patterned as to be useful in the forming of designs on cake icing and the like.

The opposed ends or end edges of the implement sheet follow the arc of the sheet and define, respectively, an outwardly bowed and beveled cutting edge and a beaded handle edge. The beaded handle edge has the entire arc thereof in a single plane and hence provides a convenient and stable base for a positioning of the implement upright on a work surface. The cutting edge is useful as a scraper, a food chopper and for the cutting of foodstuffs, such as dough.

The sheet is also particularly adapted to mount to the rim of a mixing bowl or the like so as to project horizontally inward thereof in overlying relation to the mouth and interior of the bowl with the concavity defined by the arcuate sheet upwardly directed and forming a trough for the retention and selective discharge therefrom of foodstuffs to the bowl. The mounting of the implement to the rim is effected through the provision of a transversely elongate arcuate opening substantially closer to the handle than the cutting end and including a forward edge engageable with the interior of the bowl immediately adjacent the rim thereof, and an outer edge with an extending lip engageable with and immediately beneath the bowl rim. The opposed ends of the opening engage on the upper surface of the rim for a stabilization of the implement sheet.

The positioning of the rim-accommodating opening adjacent the handle end of the implement sheet allows for a projection of a major portion of the implement sheet into the interior of bowl for a more centralized introduction of ingredients, normally of the type as to be added gradually as the mixing or blending progresses. This orientation of the opening, particularly in light of the smooth interior and exterior surfaces of the sheet, can provide an additional finger grip when the implement is used as a scoop for flour, sugar and like ingredients.

Further features, uses and advantages of the implement will become apparent from the more detailed description of the invention following hereinafter.

DESCRIPTION OF PREFERRED EMBODIMENT

Referring now more specifically to the drawings, the multi-purpose implement 10 is formed of a one-piece sheet of material, such as polypropylene, of sufficient rigidity to function as a scraper, food cutter, food ladle and the like. The implement, at the same time, incorporates a slight degree of resilient flexibility to conform to the wall of a mixing bowl 12 or the like. The implement is approximately square and arcuately shaped about an imaginary longitudinal center line 14 to define a concavo-convex configuration.

Figure 1:
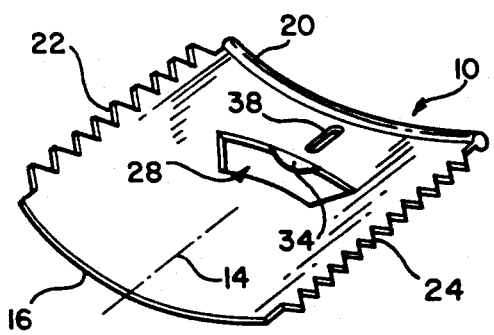
FIG. 1 is a perspective view of the multiple purpose implement of the invention.
Figure 3:
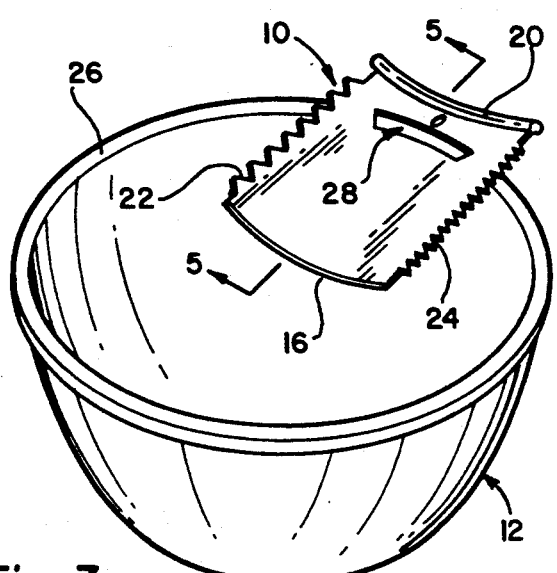
FIG. 3 is a perspective view of the implement mounted on the mixing bowl.
Figure 2:
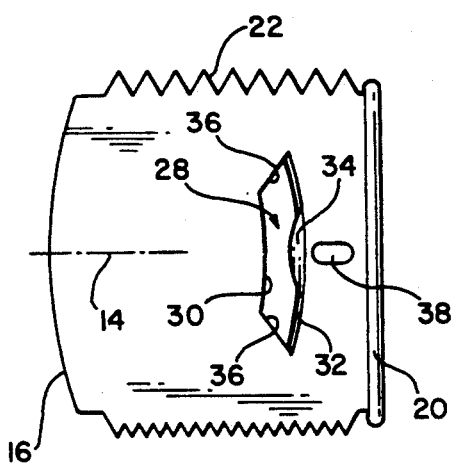
FIG. 2 is a top plan view thereof.

An integral blade 16 is defined at one longitudinal end of the implement 10 by a beveling of the sheet, as at 18, for the arced transverse width thereof. This blade end 16, as best noted in FIG. 2, will be slightly forwardly convex to more closely conformed to the interior of the bowl 12 when used a scraper or chopping implement. Similarly, by arcuately configuring the blade end 16, the forwardmost central portion thereof is coextensive with the bottom of the trough defined by the concave upper surface for both the scooping of material and more particular the controlled feeding of the ingredients therefrom to the interior of a bowl upon a mounting of the implement 10 to the bowl 12 as will be described subsequently.

A handle 20 is integrally defined at the second longitudinal end of the sheet and comprises an enlarged grip-enhancing bead extending along the full transverse width of the sheet. The bead handle, while following the transverse arcuate curvature of the sheet, lies or extends in a single plane to define a flat relatively wide base for a vertical standing of the implement 10 on a work top, normally a table top or counter.

The opposed side edges of the implement sheet each have a series of teeth 22, 24 defined therealong. These teeth are preferably formed as substantially equilateral triangles with peak and valley angles of approximately 60 degrees. The teeth 22 along a first side edge are approximately twice the height of the teeth 24 along the second side edge. The teeth along each edge are formed within the plane of the sheet and provide multiple functional advantages, including enhancing the ability of the implement to act as a interior scraper for bowls, and providing dual patterned edges for making designs on cake icings or the like.

A particularly significant aspect of the implement 10 is the incorporation therein of means for mounting the implement to the conventionally provided outwardly flared rim 26 of a mixing bowl or the like 12. This means comprises a transversely elongate opening 28 centered on the longitudinal center line 14 and defined by arcuate edges, referred to, relative to the interior of the bowl 12, as an inner edge 30 and outer edge 32. The outer edge 32 includes a central inwardly projection arcuate lip 34. The opposed ends 36 of the opening 28 angle outwardly from the opposed ends of the edge 30 to the respective ends of the relatively longer edge 32. The opening 28, thus formed, is of an arcuate configuration which receives a corresponding arcuate portion of the rim 26 for a mounting of the implement 10 thereto. The opening 28 is positioned substantially closer to the handle end 20 than the blade end 16 and is intended to mount the implement with the concave or trough-defining surface thereof uppermost.

Figure 4:
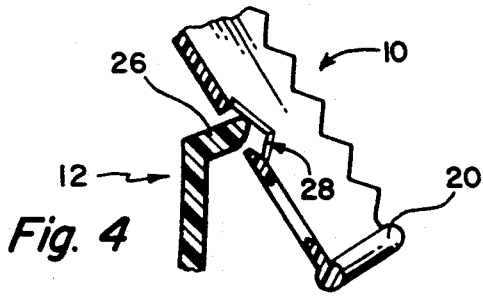
FIG. 4 is a detail illustrating the manner of mounting the implement to a mixing bowl rim.
Figure 5:
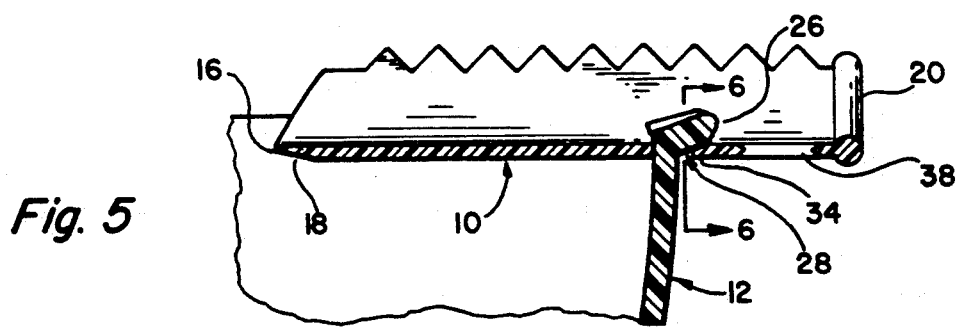
FIG. 5 is an enlarged longitudinal cross-sectional view taken substantially on a plane passing along line 5—5 in FIG. 3 and illustrating the rim-mounted implement.
Figure 6:
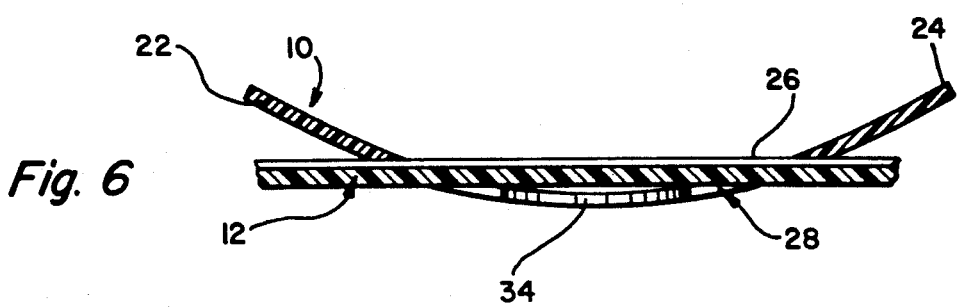
FIG. 6 is a transverse cross-sectional view taken substantially on a plane passing along plane 6—6 in FIG. 5.

Noting FIGS. 4, 5 and 6, in mounting the implement, the sheet is positioned generally vertically or at right angles to the bowl rim 26, slid inwardly over the rim and subsequently pivoted to a horizonal position with the arcuate inner edge 30 of the opening 28 engaging the inner surface of the bowl at the rim, and with the outer edge lip 34 engaging beneath the rim. At that point, and noting FIG. 6, the angled outer ends 26 of the opening 28 seat on the rim and combine with the edge 30 and lip 34 in providing for a stable horizontal positioning of the implement 10.

When mounted to the bowl as described above, the implement 10 forms a trough-like shelf from which ingredients can be gradually introduced into the bowl for a controlled mixing of blending without the necessity of holding a separate scoop or ladle.

While not limited thereto, and as an example of one size implement, when intended for use with a 3 liter mixing bowl, the implement can be approximately 4 inches square with the arc of the sheet on a radius of approximately 4¾ inches.

Notwithstanding the stable accommodation of the implement on the bowl rim during use as above described, the implement is easily removed from the rim for manual use by merely an upward pivoting of the inner or blade end 16 thereof. For convenience, a hanging aperture 38 will be provided through the sheet along the center line 14 between the transverse mounting opening 28 and the handle end 20.

The foregoing illustrates the principals of the invention, including the unique structural details thereof and the multiple functional advantages derived therefrom. Other uses of the implement as a culinary tool may be recognized by those skilled in culinary arts, and as such, the scope of protection afforded the invention is to be limited only by the scope of the claims following hereinafter.

I claim:

1. A multiple purpose kitchen implement comprising a sheet of shape-sustaining material having a forward blade end, a rear handle end and opposed longitudinal first and second side edges, said sheet being concavo-convex along the length thereof between said ends and defining an arc between said edges, each of said ends following said arc, said blade end being forwardly convex, said handle end, for the complete length thereof along said arc, lying in a single plane and defining a planar base continuously between said side edges for a vertical positioning of the implement on a work surface, said sheet being of a constant thickness throughout substantially the entire extent thereof, said handle end being relatively thicker and defining a gripping means, said blade end being beveled, and a mounting opening defined through said sheet for engagement of said implement with a laterally projecting bowl rim for mounting of said implement to a bowl, said opening extending transversely of said sheet along the arc thereof generally parallel to and spaced forward of said handle end, said opening including opposed spaced generally arcuate edges respectively comprising an inner edge for engagement with the inner surface of a bowl adjacent the rim of the bowl, and an outer edge for engagement beneath the bowl rim, said mounting opening including ends extending between said inner and outer opening edges, said sheet, between each opening end and the corresponding sheet edge, being adapted for overlying engagement with the bowl rim upon a mounting of said implement thereto and a retention of said implement generally parallel to the rim, said opening being substantially closer to said handle than said blade end whereby a major portion of said implement will project inward of the rim.

2. The kitchen implement of claim 1 wherein said mounting opening outer edge includes a central lip portion extending inwardly relative to the opening to underlie the bowl rim.

3. A kitchen implement particularly adapted for mounting to and use with a bowl having an upwardly directed side wall with a laterally outwardly projecting upper rim thereabout; said implement comprising a sheet of shape-sustaining material, said sheet being transversely arcuate and including arcuate forward and rear ends and opposed side edges, an elongate mounting opening defined through said sheet transversely thereof and centrally between said side edges for engagement of the bowl rim therethrough for a mounting of the implement to the bowl, said mounting opening including an inner edge engageable with the bowl wall and a generally parallel outer edge engageable beneath the bowl rim, said mounting opening including ends between said inner and outer opening edges for engagement in overlying relation to the rim whereby the mounted implement will engage both over and under the bowl rim and with the bowl wall immediately inward of the bowl rim said mounting opening being positioned substantially closer to said rear end of said sheet than said forward end thereof, said implement, upon mounting to the bowl, having a major portion of said sheet extending inwardly of said bowl generally parallel to the rim.

4. The kitchen implement of claim 3 wherein said mounting opening outer edge includes a central lip portion extending inwardly relative to said opening to underlie the bowl rim.

5. The kitchen implement of claim 4 wherein said inner and outer edges of said opening are arcuate with said opening defining an arc having the concave side thereof toward said rear end of said sheet.

6. The kitchen implement of claim 5 wherein said sheet is of a constant thickness throughout substantially the entire extent thereof, said rear end being relatively thicker and defining a handle, said handle lying in a single plane and defining a planar base continuously between said opposite side edges of said sheet for a vertical positioning of said implement on a support surface.

7. The kitchen implement of claim 6 including generally triangular teeth defined along said opposed side edges for use of said side edges as scraping means for a bowl interior and as means for providing patterned designs on foodstuffs, said teeth along one of said side edges being smaller and more closely spaced than said teeth along the opposed side edge.

* * * * *